United States Patent [19]
Sakaguchi

[11] Patent Number: 5,534,916
[45] Date of Patent: Jul. 9, 1996

[54] DIGITAL ELECTRONIC STILL CAMERA OPERABLE IN A TEXT MODE FOR PHOTOGRAPHING A BILEVEL IMAGE

[75] Inventor: Norihiro Sakaguchi, Yokohama, Japan

[73] Assignee: Ricoh Company, Ltd., Tokyo, Japan

[21] Appl. No.: 416,208

[22] Filed: Apr. 4, 1995

[30]     Foreign Application Priority Data

Apr. 5, 1994 [JP] Japan .................................. 6-067214

[51] Int. Cl.⁶ .................................................. H04N 5/228
[52] U.S. Cl. .......................... 348/222; 348/229; 348/252; 348/255
[58] Field of Search ..................................... 348/222, 229, 348/231, 234, 252, 253, 255, 256; 358/909.1, 174, 909; H04N 5/228, 5/76, 9/68, 5/208, 9/64, 5/20

[56]             References Cited

U.S. PATENT DOCUMENTS 4,780,766  10/1988  Nutting ................................. 348/229
5,274,458  12/1993  Kondo ................................... 348/222

*Primary Examiner*—Safet Metjahic
*Assistant Examiner*—Sherrie Hsia
*Attorney, Agent, or Firm*—Oblon, Spivak, McClelland, Maier & Neustadt

[57]              ABSTRACT

A digital electronic still camera operable in a text mode for clearly shooting a bilevel image, e.g., characters printed or formed on a document. A luminance signal can be roughly corrected with respect to shading by a simple circuit arrangement. This corrects a decrease in the quantity of light in the peripheral portion of a frame and thereby renders characters or similar bilevel images in a picture highly legible.

4 Claims, 7 Drawing Sheets

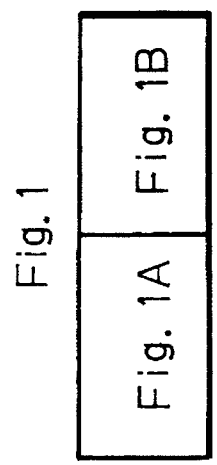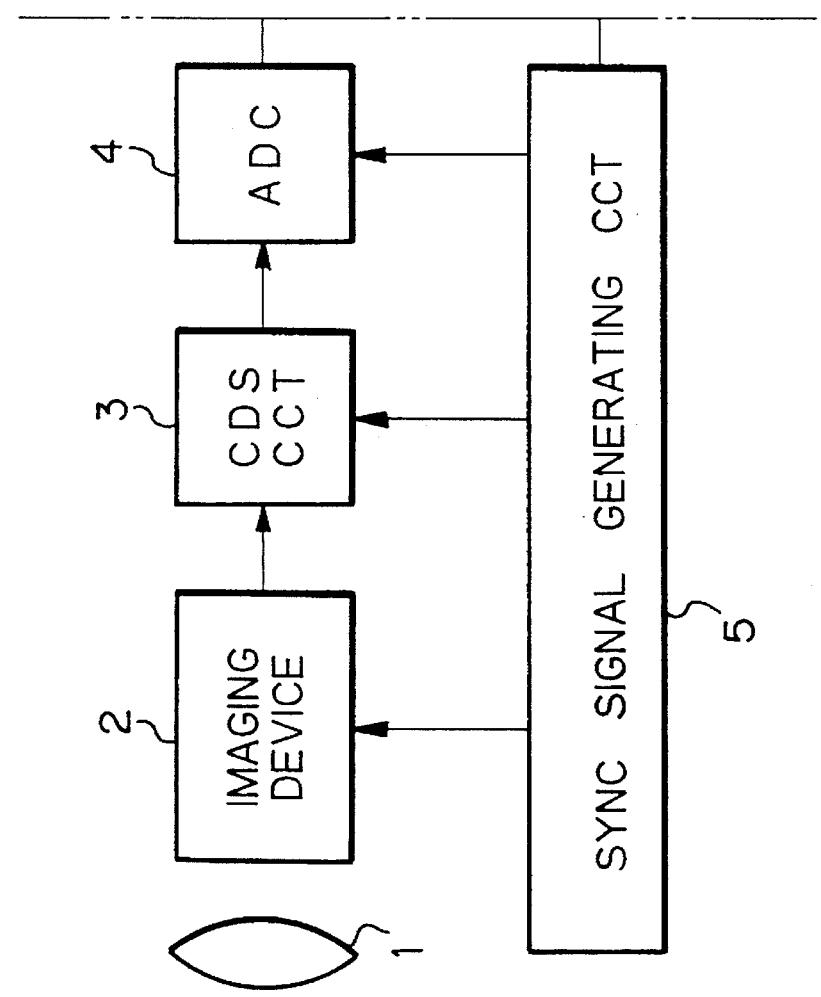

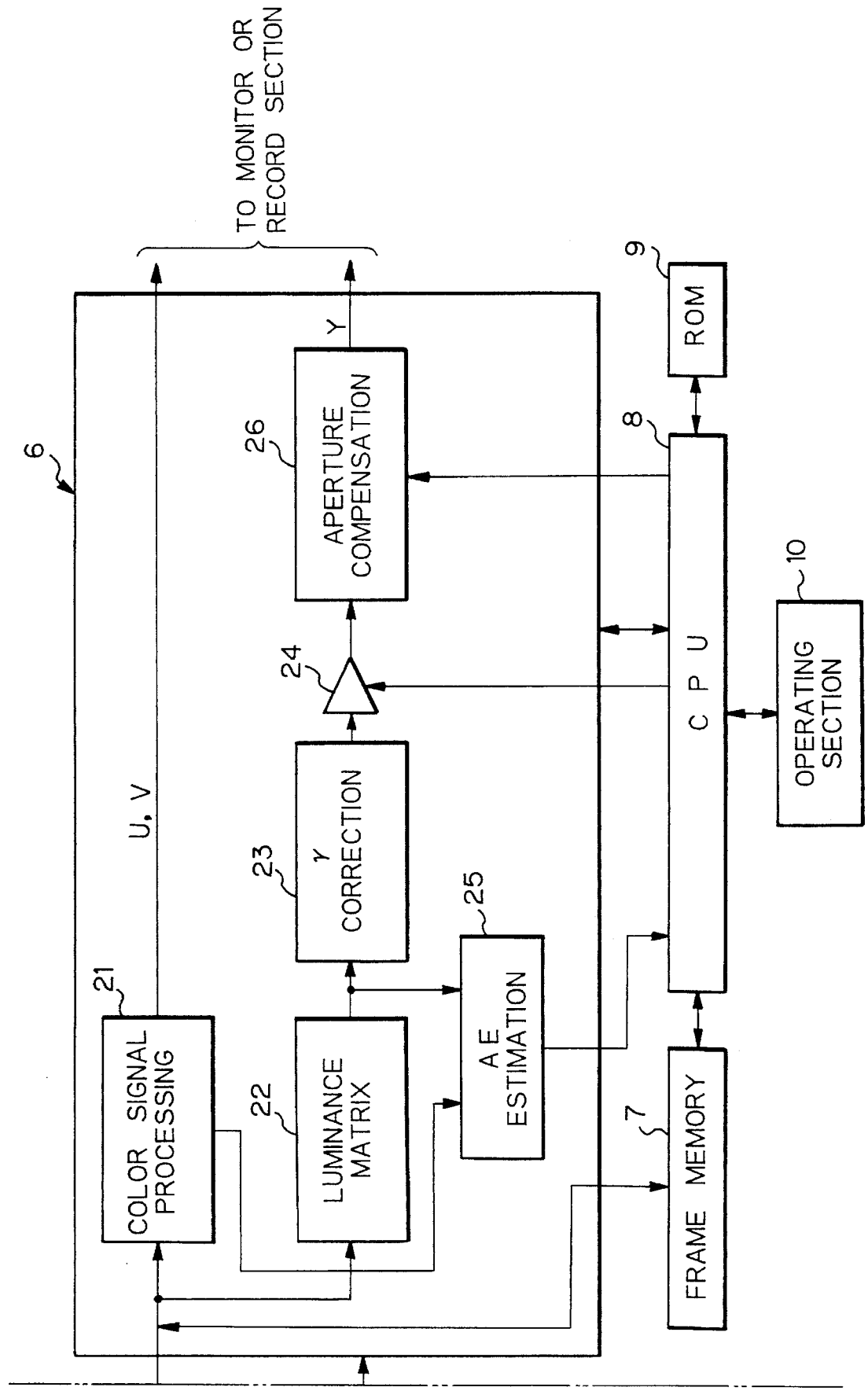

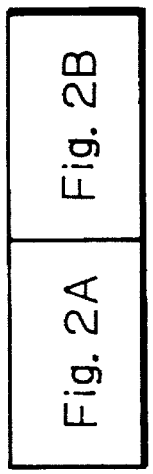
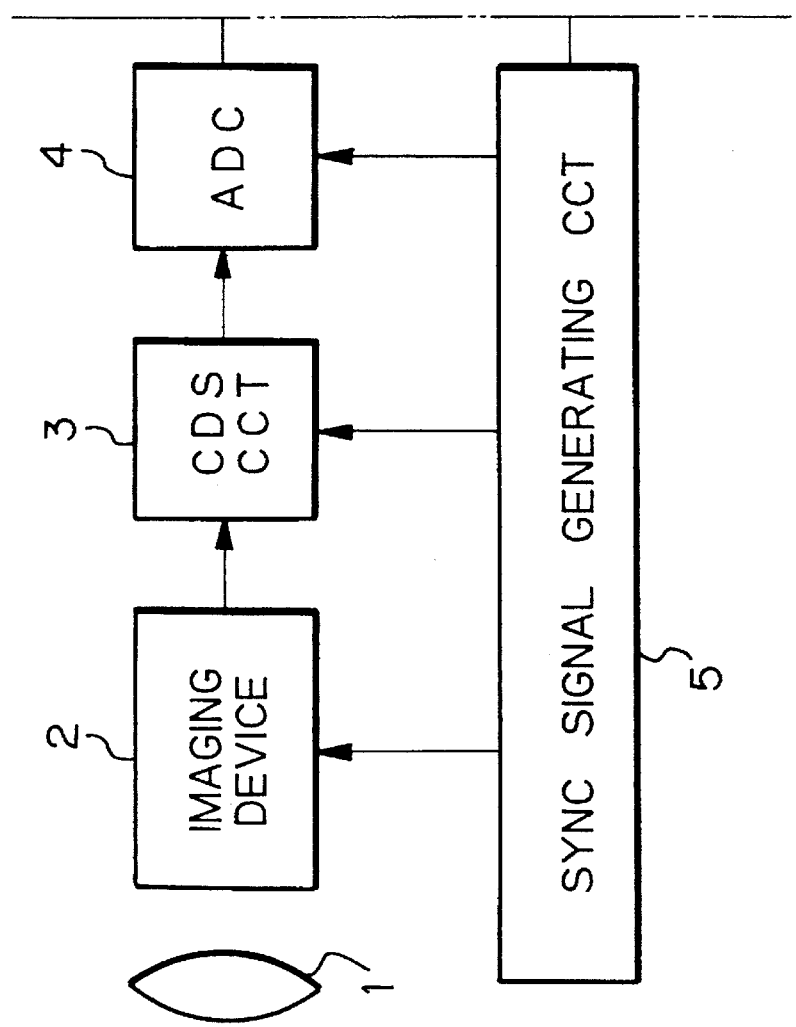

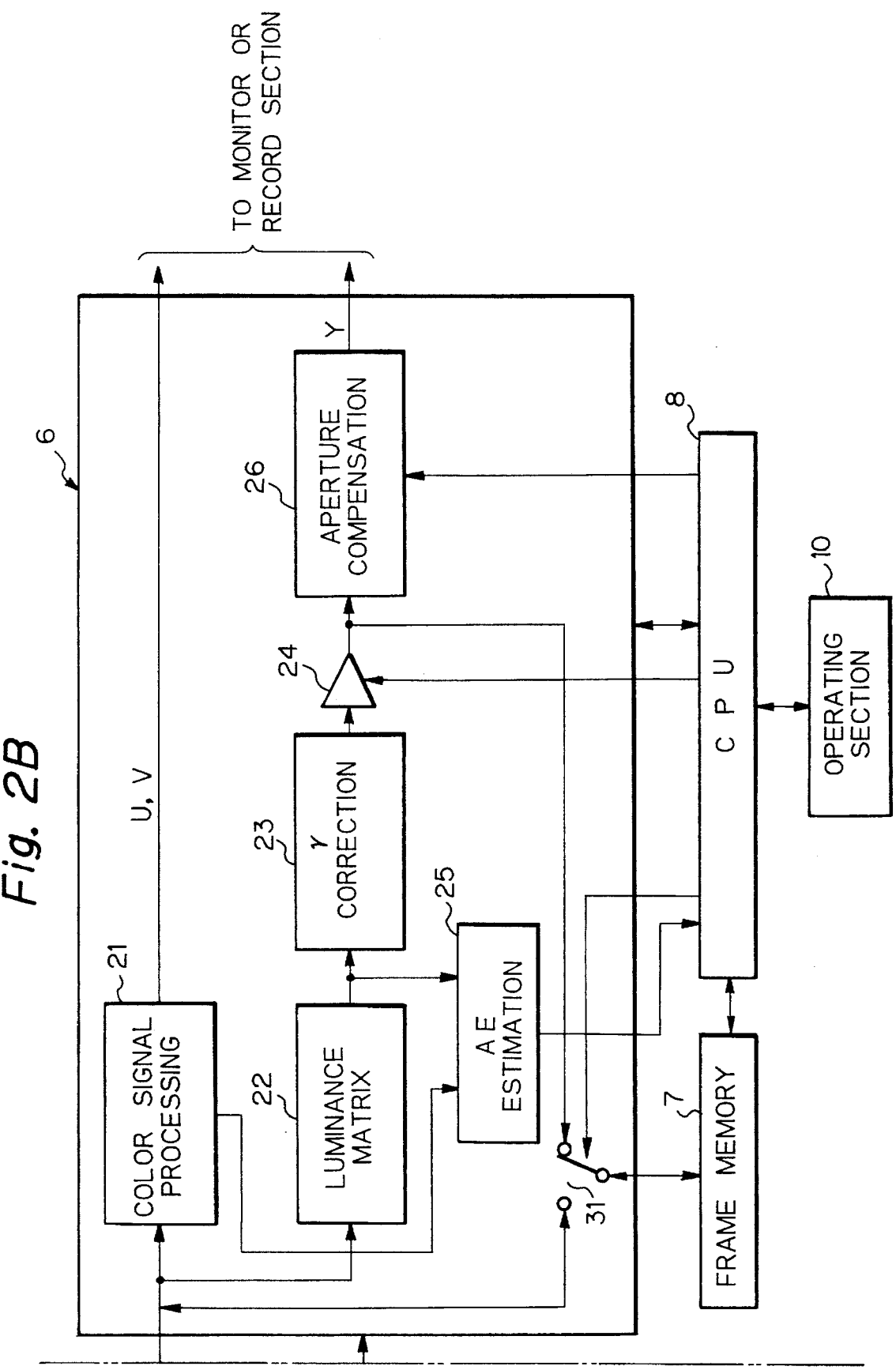

DIGITAL ELECTRONIC STILL CAMERA OPERABLE IN A TEXT MODE FOR PHOTOGRAPHING A BILEVEL IMAGE

BACKGROUND OF THE INVENTION

The present invention relates to a digital electronic still camera for converting the image of an object to digital data and recording the digital data in a medium and, more particularly, to a digital electronic still camera operable in a text mode for clearly shooting a bilevel image, e.g., characters printed or formed on a document.

Generally, a digital electronic still camera includes a CCD(Charge Coupled Device) image sensor or similar imaging device for generating an image signal. The image signal has customarily been processed as an analog signal up to a CDS (Correlative Dual Sampling) circuit, then transformed to a digital image signal by an analog-to-digital converter, and then processed in various ways by a digital process. A lens, also included in the camera for focusing the image of an object onto the imaging device, has such a characteristic that the quantity of light incident thereto decreases with an increase in the distance from the optical axis. In the light of this, a camera of the type handling an analog image signal is often provided with a shading correction circuit. The shading correction circuit corrects the decrease in the quantity of light in the peripheral portion of an image which is represented by the analog image signal.

However, when the shading correction circuit is digitized in a digital electronic still camera which processes an image signal as a digital signal, the circuit is scaled up. Particularly, in the case of a miniature camera of this type, the degradation of an image is conspicuous because the diameter of a lens available with the camera is limited. A digital electronic still camera may be used as a device for reading a document or similar text. The prerequisite with this kind of application is that the decrease in the quantity of light in the peripheral portion of an image be corrected; otherwise, characters would be illegible in the peripheral portion when reproduced, failing to transfer information accurately.

SUMMARY OF THE INVENTION

It is, therefore, an object of the present invention to provide a digital electronic still camera capable of clearly reading characters or similar bilevel images printed or formed on sheets.

In accordance with the present invention, a digital electronic still camera has a lens for focusing a reflection from an object and incident thereto, an imaging device for transforming the image of the object focused by the lens to an analog image signal, an analog-to-digital converter for converting the analog image signal to a digital image signal, a gain control circuit for executing gain control with a luminance signal produced from the digital image signal, a controller for setting a gain for the luminance signal in the gain control circuit, a storage for storing shading data matching the optical characteristic of the lens beforehand, and a setting device for setting a text mode in the controller. When the text mode is set, the controller sets the gain in the gain control circuit in accordance with the shading data stored in the storage.

Also, in accordance with the present invention, a digital electronic still camera has a lens for focusing a reflection from an object and incident thereto, an imaging device for transforming the image of the object focused by the lens to an analog image signal, an analog-to-digital converter for converting the analog image signal to a digital image signal, a gain control circuit for executing gain control with a luminance signal produced from the digital image signal, a controller for setting a gain for the luminance signal in the gain control means, a a frame memory for storing the luminance signal, and a setting device for setting a text mode in the controller. When the text mode is set, the controller calculates the mean white level of a white area and the mean black level of a black area included in the luminance signal stored in the frame memory, and sets the gain in the gain control circuit such that the signal level of the white area and the signal level of the black area are respectively corrected to to mean white level and the mean black level.

BRIEF DESCRIPTION OF THE DRAWINGS

The above and other objects, features and advantages of the present invention will become apparent from the following detailed description taken with the accompanying drawings in which:

FIGS. 1, 1A and 1B are block diagrams schematically showing a digital electronic still camera embodying the present invention;

FIGS. 2, 2A and 2B are block diagrams schematically showing an alternative embodiment of the present invention;

DESCRIPTION OF THE PREFERRED EMBODIMENTS

Figure 3:
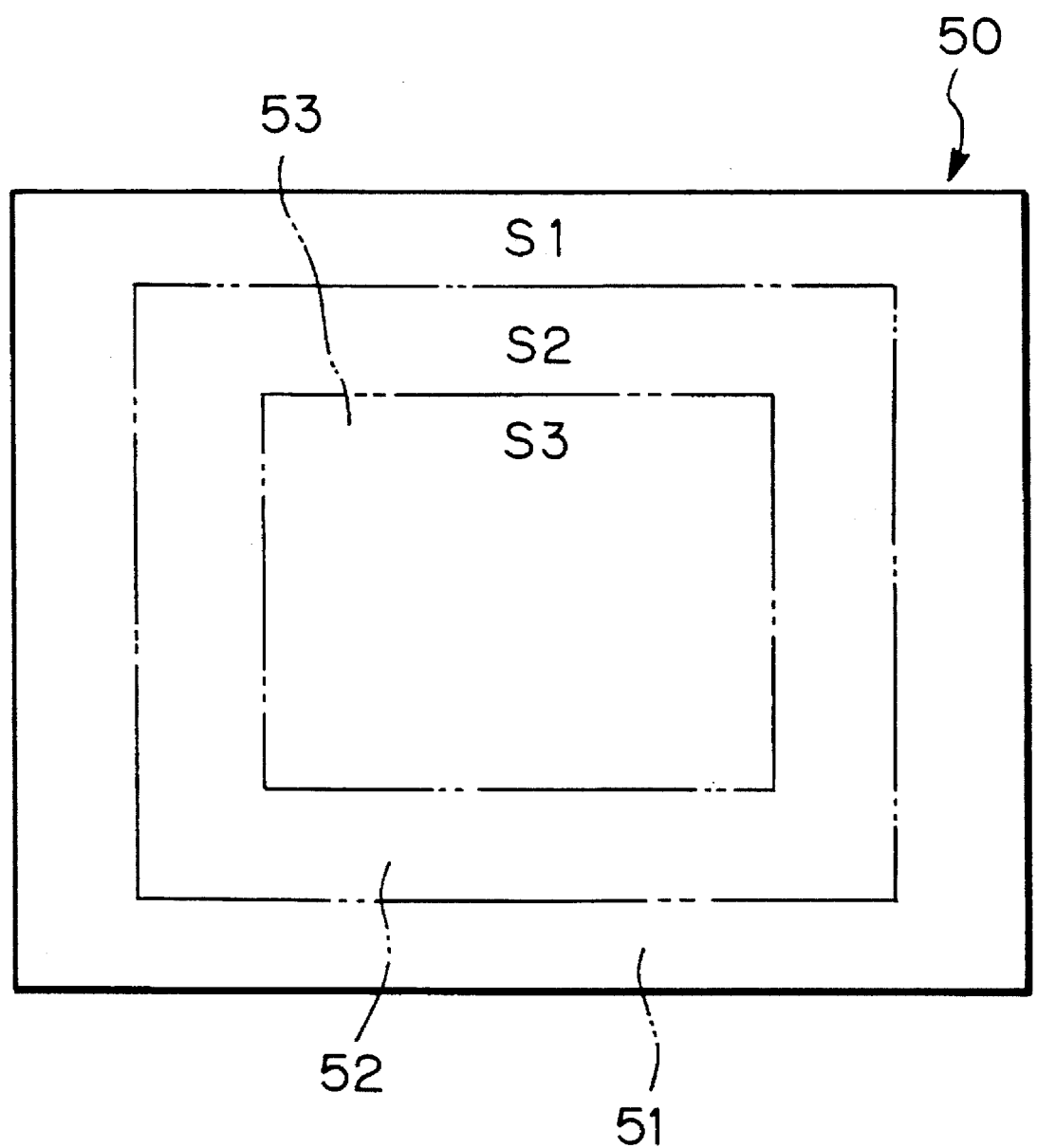
FIG. 3 shows a frame divided into a peripheral portion, an intermediate portion and a central portion in accordance with the present invention.

Referring to FIGS. 1A and 1B of the drawings, a digital electronic still camera embodying the present invention is shown and includes a lens 1. A CCD image sensor or similar imaging device 2 generates an analog image signal representing an image which is input thereto via the lens 1. A CDS circuit 3 processes the analog image signal. An analog-to-digital converter (ADC) 4 transforms the analog image signal from the CDS circuit 3 to a digital image signal. A synchronizing (SYNC) signal generating circuit 5 delivers synchronizing signals to the imaging device 2, CDS circuit 3, ADC 4, etc. A digital process circuit 6 is implemented by an IC (Integrated Circuit). A frame memory 7 is used to temporarily store the digital image signal. A CPU (Central Processing Unit) controls the various constituents of the camera. An operating section 10 allows the user to operate the camera. The reference numeral 9 designates a ROM (Read Only Memory).

The ROM 9 stores shading data particular to the lens 1, i.e., data representing the decrease in the quantity of light at the peripheral portion of the lens 1. Specifically, as shown in FIG. 3, a frame 50 is divided into a peripheral portion 51, an intermediate portion 52, and a central portion 53. The ROM 9 stores shading data $S_1$, $S_2$ and $S_3$ respectively corresponding to the three portions 51, 52 and 53 of the frame 50.

The embodiment allows the user to select either an ordinary scene mode or a text mode by manipulating the operating section, or setting means, 10. The scene mode is used to shoot a desired scene in a conventional manner. The text mode is used to shoot a bilevel image, e.g., characters printed or formed on a document.

The digital image signal output from the ADC 4 and representative of one frame is written to a frame memory 7. The digital image signal is read out of the frame memory 7 and applied to the digital process circuit 6. In the digital process circuit 6, a color signal processing 21 processes the input image signal to produce color signals U and V. At the same time, a luminance matrix 22 and a γ (gamma) conversion 23 process the image signal to produce a luminance signal Y. A gain control (GC) 24 executes gain control with the luminance signal Y. The outputs of the color signal processing 21 and luminance matrix 22 are fed to an AE (Automatic Exposure) estimation 25. In response, the AE estimation 25 outputs an AE estimation value representative of the estimated level of the quantity of light incident to the lens 1. The AE estimation value is delivered to the CPU 8. An aperture compensation 26 executes aperture compensation with the luminance signal Y from the GC 24 such that contours included in the image are adequately enhanced.

Figure 4:
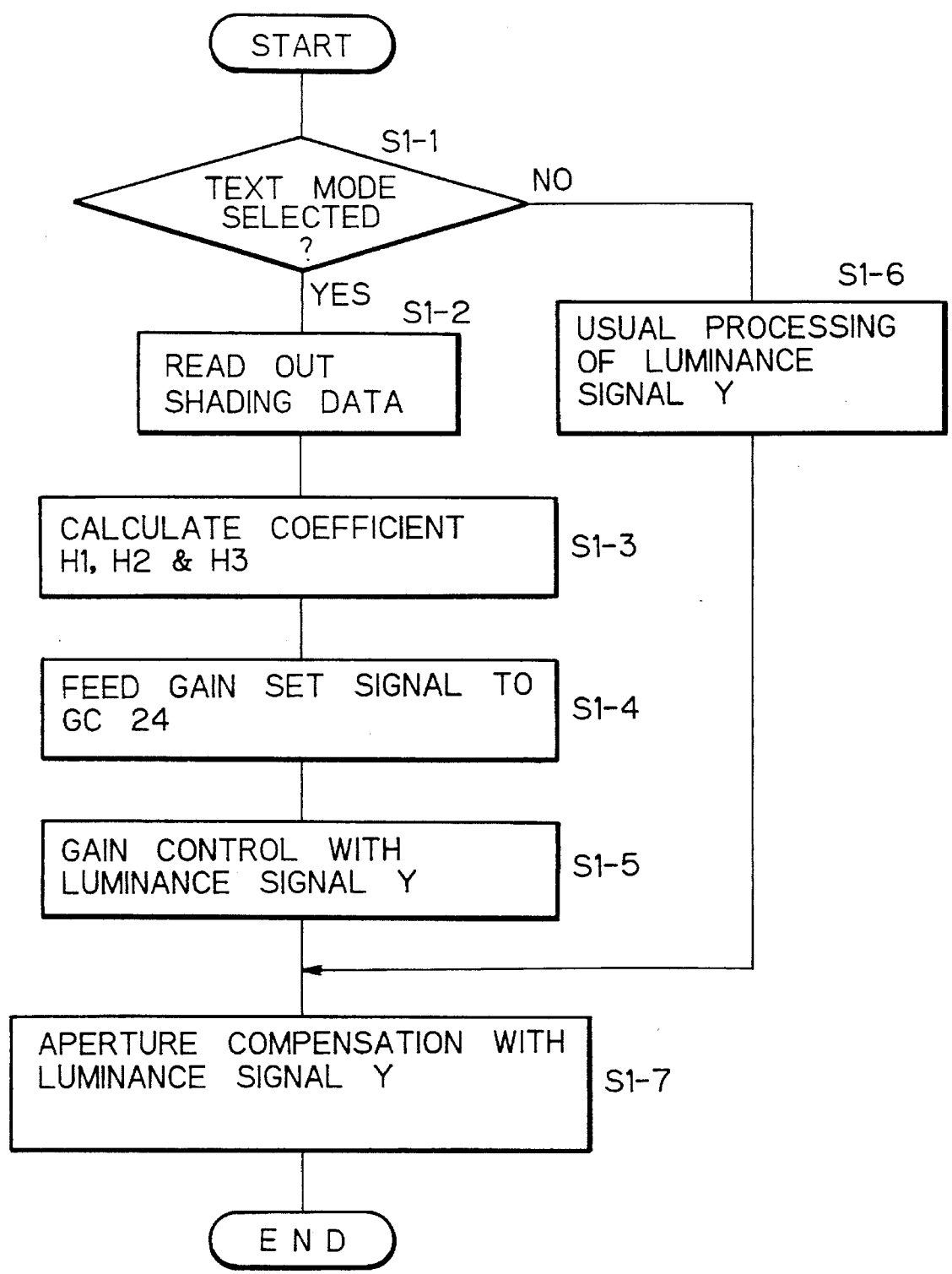
FIGS. 4 and 5 are flowcharts respectively demonstrating the operations of the embodiments shown in FIGS. 1A, 1B, 2A and 2B.

How the luminance signal Y is processed will be described with reference to FIG. 4. As shown, when the text mode is selected on the operating section 10 (YES, step S1-1), the CPU 8 reads the shading data $S_1$, $S_2$ and $S_3$ out of the ROM 9 (step S1-2). The CPU 8 calculates, based on the data $S_1$–$S_3$, correction coefficients $H_1$, $H_2$ and $H_3$ respectively associated with the three portions of 51, 52 and 53 of the frame 50 (step S1-3). The correction coefficient sequentially increases from the center to the periphery of the frame 50 due to the optical characteristic of the lens 1, i.e., a relation $H_1 > H_2 > H_3$ holds.

Every time the γ correction 23 outputs a luminance signal Y corresponding to one scanning line, the CPU 8 delivers to the GC 24 a gain set signal matching the position of the luminance signal Y in the frame 50 and matching the correction coefficients H1, H2 and H3. Further, the CPU 8 corrects the level of the entire gain set signal on the basis of the AE estimation value and delivers the corrected signal to the GC 24 (step S1-4). If the AE estimation value is small, meaning that the quantity of light incident to the lens 1 is small, the CPU 8 raises the level of the entire gain set signal. If the AE estimation value is great, meaning that the quantity of light incident to the lens 1 is great, the CPU 8 lowers the level of the entire gain set signal.

The correction coefficients $H_1$, $H_2$ and $H_3$ have a relation of $H_1 > H_2 >$ and H3, as stated above. Hence, the CPU 8 sets the gain set signal such that the brightness sequentially increases from the central portion 53 to the peripheral portion 51 of the frame 50. The GC 24 controls the luminance signal Y in accordance with the gain set signal (step S1-5) and feeds the controlled signal Y to the aperture compensation 26 (step S1-7). When the scene mode is selected on the operating section 10, the CPU 8 executes only usual gain control with the luminance signal Y (step S1-6), skipping the steps S1-2 to S1-5. The luminance signal Y controlled in the step S1-6 is also applied to the aperture compensation 26 (step S1-7).

The aperture compensation 26 executes aperture compensation with the luminance signal Y from the GC 24. The CPU 8 makes the amount of aperture compensation smaller in the text mode than in the scene mode. This successfully prevents the contours of characters or similar bilevel image from being excessively enhanced. As a result, a highly legible image can be reproduced. The CPU 8 determines, based on the AE estimation value, an amount in which the aperture compensation should be lowered. If the AE estimation value is small, meaning that the quantity of light incident to the lens 1 is small, the CPU 8 reduces the amount of decrease in the aperture compensation; if otherwise, it increases the amount of decrease. The luminance signal Y undergone the aperture compensation is output to a liquid crystal display or similar monitor or to an IC memory drive or similar recording section together with the color signals U and V.

As stated above, the luminance signal Y from the γ conversion 23 is subjected to gain control in matching relation to the characteristic of the lens 1. This makes it possible to execute rough shading correction with the luminance signal Y despite the simple circuitry. The resulting bilevel image, e.g., characters are highly legible because the decrease in the quantity of light in the peripheral portion of the frame is corrected. Furthermore, the level of the entire gain set signal and the amount of decrease in the aperture compensation are corrected on the basis of the AE estimation value. This optimizes the brightness of the entire image and the enhancement of the contours of characters without regard to the quantity of light incident to the lens 1.

FIGS. 2A and 2B show an alternative embodiment of the present invention. In FIGS. 2A and 2B, the same constituents as the constituents shown in FIGS. 1A and 1B are designated by the same reference numerals, and a detailed description thereof will not be made in order to avoid redundancy. As shown, this embodiment differs from the previous embodiment in that the ROM 9 is omitted, and in that the digital process circuit 6 additionally includes a signal switch 31. The CPU 8 feeds a switching signal to the signal switch 31 in order to control the input and output of the digital image signal from the frame memory 7.

Figure 5:
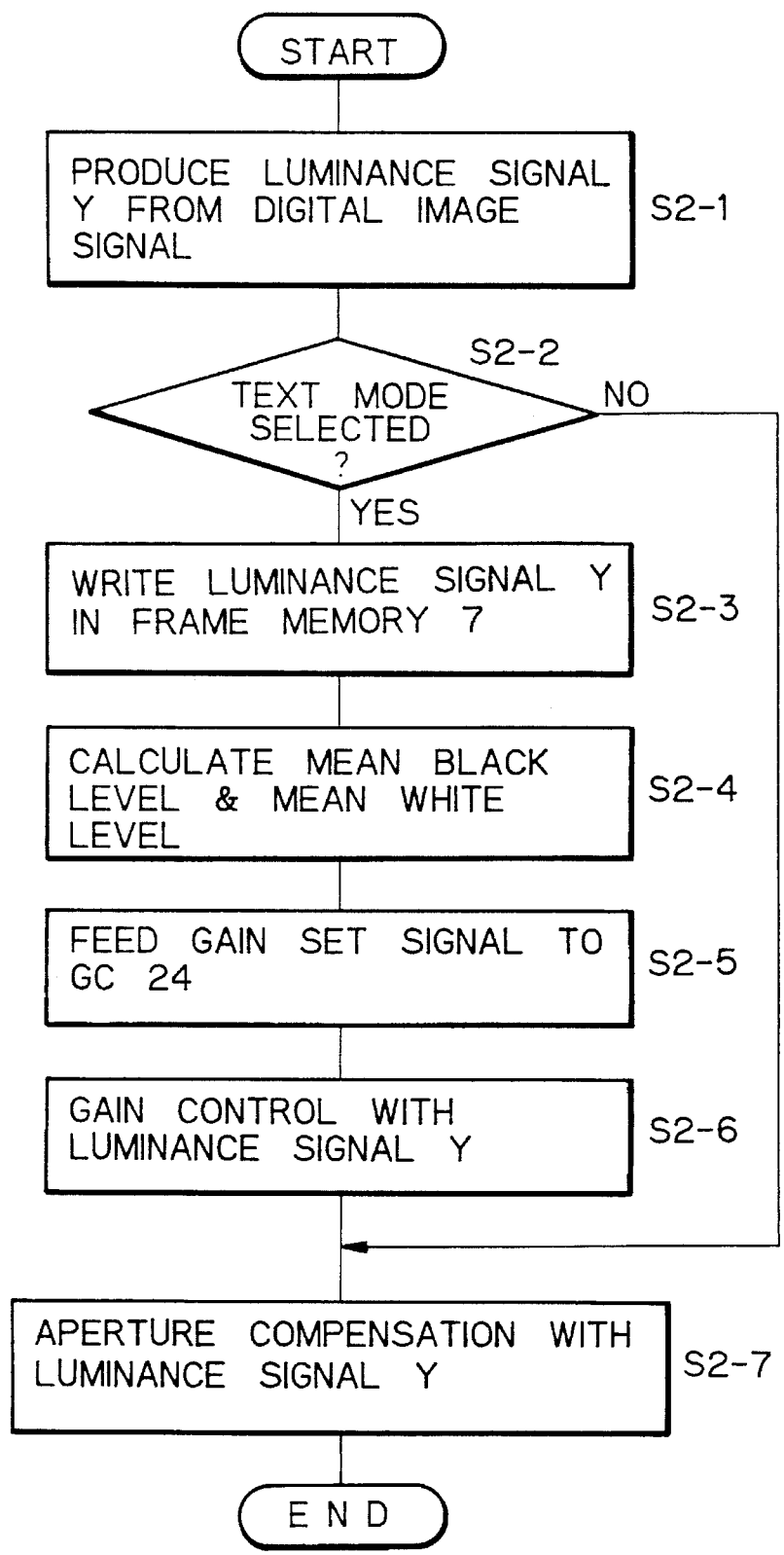

The operation of the alternative embodiment will be described with reference to FIG. 5. As shown, the CPU 8 causes the digital image signal from the ADC 4 to be written to the frame memory 7 and then output to the color signal processing 21 and luminance matrix 22, as in the previous embodiment. In this embodiment, the frame memory 7 is so constructed as to hold the digital image signal written thereto until a new digital image signal arrives. The color signal processing 21 produces the color signals U and V out of the digital image signal. The luminance matrix 22 and γ conversion 23 produce the luminance signal Y out of the digital image signal (step S2-1) and delivers it to the GC 24. In response, the GC 24 executes usual gain control with the luminance signal Y.

When the scene mode is selected (NO, step S2-2), the CPU 8 feeds the luminance signal Y output from the GC 24 to the aperture compensation 26 (step S2-7). The aperture compensation 26 executes aperture compensation with the luminance signal Y. The luminance signal Y from the aperture compensation 26 is sent to the monitor or recording section together with the color signals U and V, as in the previous embodiment. On the other hand, when the text mode is selected (YES, step S2-2), the CPU 8 controls the signal switch 31 to connect the GC 24 to the frame memory 7. As a result, the luminance signal Y from the GC 24 is written to the frame memory 7 (step S2-3). At this instant, the luminance signal Y is written to the area of the frame memory 7 different from the area storing the digital image signal and is preserved until a new luminance signal Y arrives.

Subsequently, by referencing the luminance signal Y stored in the frame memory 7, the CPU 8 calculates the mean white level of a white area and the mean black level of a black area included in the luminance signal Y (step S2-4). Then, the CPU 8 causes the digital image signal to be again fed from the frame memory 7 to the luminance matrix 22 and feeds the gain set signal to the GC 24 in synchronism with the luminance signal Y output from the matrix 22 and γ conversion 23 (step S2-5). The gain set signal causes the signal level of the white area of the luminance signal Y to become flat at the mean white level and causes the signal level of the black area of the same to become flat at the mean black level. The GC 24 controls the luminance signal Y from the γ conversion 23 by using a gain matching the gain set signal (step S2-6) and delivers the controlled signal Y to the aperture compensation 26 (step S2-7).

As stated above, the CPU 8 calculates a mean white level and a mean black level out of the luminance signal Y written to the frame memory 7, and selects a gain such that the signal levels of the white area and black area of the signal Y become flat at the mean white level and the mean black level, respectively. As a result, the luminance signal Y is so corrected as to cancel the influence of shading by simple circuitry. Hence, a bilevel image, e.g., characters are legible when reproduced, because the decrease in the quantity of light in the peripheral portion of the picture is corrected.

In summary, in accordance with the present invention, when a text mode is selected, control means sets a particular gain for a luminance signal in gain control means on the basis of shading data matching the characteristic of a lens. Hence, the luminance signal can be roughly corrected with respect to shading by a simple circuit arrangement. This corrects a decrease in the quantity of light in the peripheral area of a frame and thereby renders characters or similar bilevel images in a picture highly legible.

In the text mode, the control means reduces the amount of aperture compensation to be executed by aperture compensating means. As a result, the contours of characters or similar bilevel images are prevented from being excessively enhanced, so that such images are easy to see when reproduced.

Further, in the text mode, the control means reduces the amount of decrease in the aperture compensation relatively when the light quantity level is high or increases it relatively when the light quantity level is low. This successfully optimizes the brightness of the entire picture and the enhancement of character contours, thereby rendering characters or similar bilevel images legible at the time of reproduction.

In addition, in the text mode, the control means calculates the mean white level of a white area and the mean black level of a black area included in the luminance signal stored in the frame memory, and performs gain control such that the signal levels of the white area and black area become flat at the mean white level and the mean black level, respectively. Hence, the luminance signal can be corrected in such a manner as to cancel the influence of shading by a simple circuit arrangement. It follows that the decrease in the quantity of light in the peripheral portion of a frame is corrected to render bilevel images legible at the time or reproduction.

Various modifications will become possible for those skilled in the art after receiving the teachings of the present disclosure without departing from the scope thereof.

What is claimed is:

1. A digital electronic still camera comprising:

a lens for focusing a reflection from an object and incident thereto;

imaging means for transforming an image of the object focused by said lens to an analog image signal;

analog-to-digital converting means for converting the analog image signal to a digital image signal;

gain control means for executing gain control with a luminance signal produced from the digital image signal;

control means for setting a gain for the luminance signal in said gain control means;

storing means for storing shading data matching an optical characteristic of said lens beforehand; and setting means for setting a text mode in said control means;

wherein when said text mode is set, said control means sets the gain in said gain control means in accordance with said shading data stored in said storing means.

2. A camera as claimed in claim 1, further comprising aperture compensating means for executing aperture compensation with the gain-controlled luminance signal, wherein when said text mode is set; said control means reduces an amount of the aperture compensation to be executed by said aperture compensating means.

3. A camera as claimed in claim 2, wherein when said text mode is set, said control means corrects, in accordance with a level of a quantity of light incident to said lens, the gain to be set in said gain control means and sets an amount of decrease in the aperture compensation to be executed by said aperture compensating means.

4. A digital electronic still camera comprising:

a lens for focusing a reflection from an object and incident thereto;

imaging means for transforming an image of the object focused by said lens to an analog image signal;

analog-to-digital converting means for converting the analog image signal to a digital image signal;

gain control means for executing gain control with a luminance signal produced from the digital image signal;

control means for setting a gain for the luminance signal in said gain control means;

a frame memory for storing said gain-controlled luminance signal; and setting means for setting a text mode in said control means;

wherein when said text mode is set, said control means calculates a mean white level of a white area and a mean black level of a black area included in said gain-controlled luminance signal stored in said frame memory, and sets the gain in said gain control means such that a signal level of said white area and a signal level of said black area are respectively corrected to said mean white level and said mean black level.

* * * * *